Figure 8:
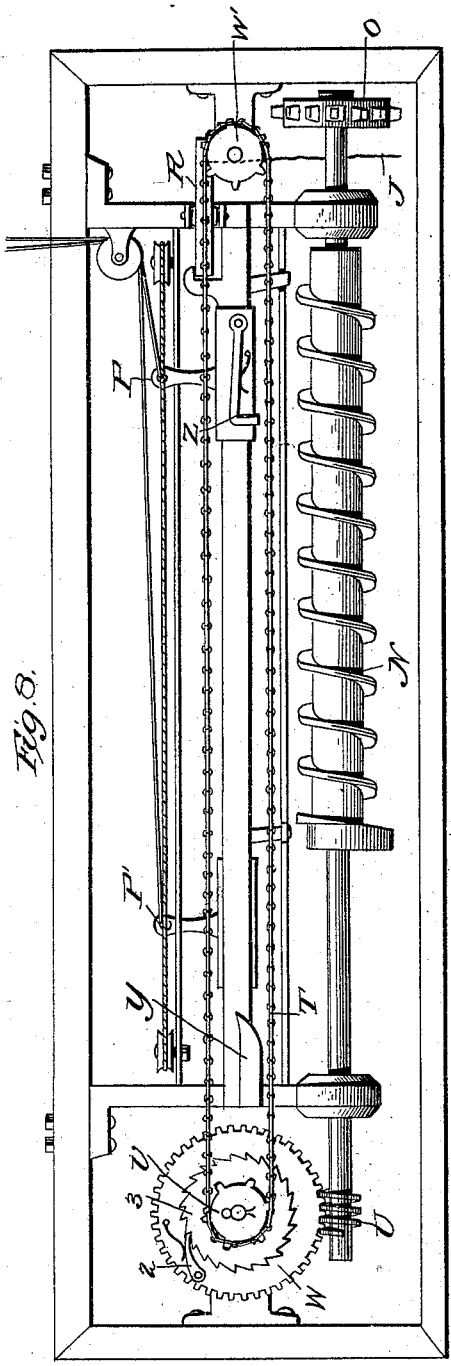

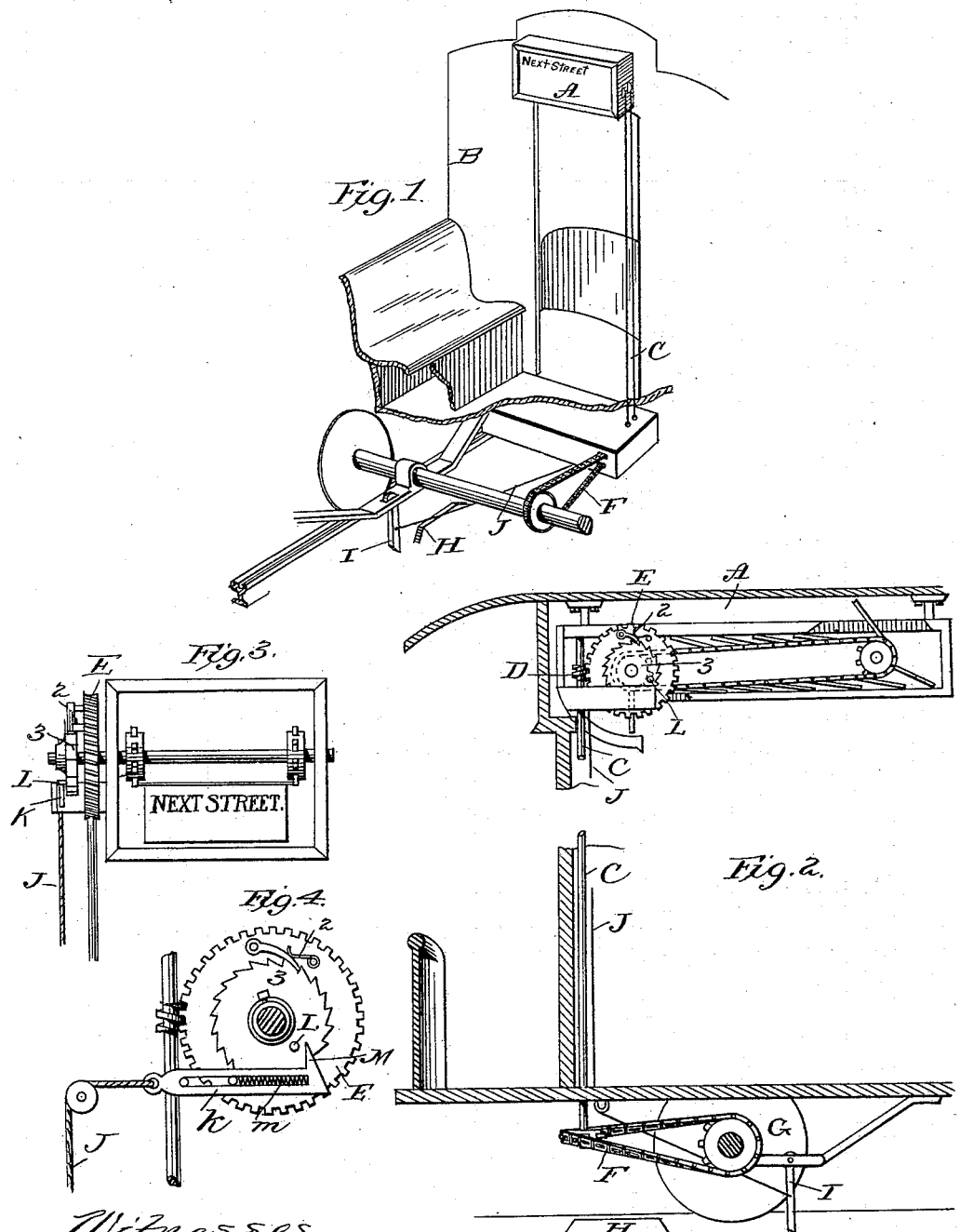

(No Model.)　　　　　　　　　　　　　3 Sheets—Sheet 2.
W. A. TURNER.
STATION INDICATOR.
No. 604,483.　　　　　　　Patented May 24, 1898.
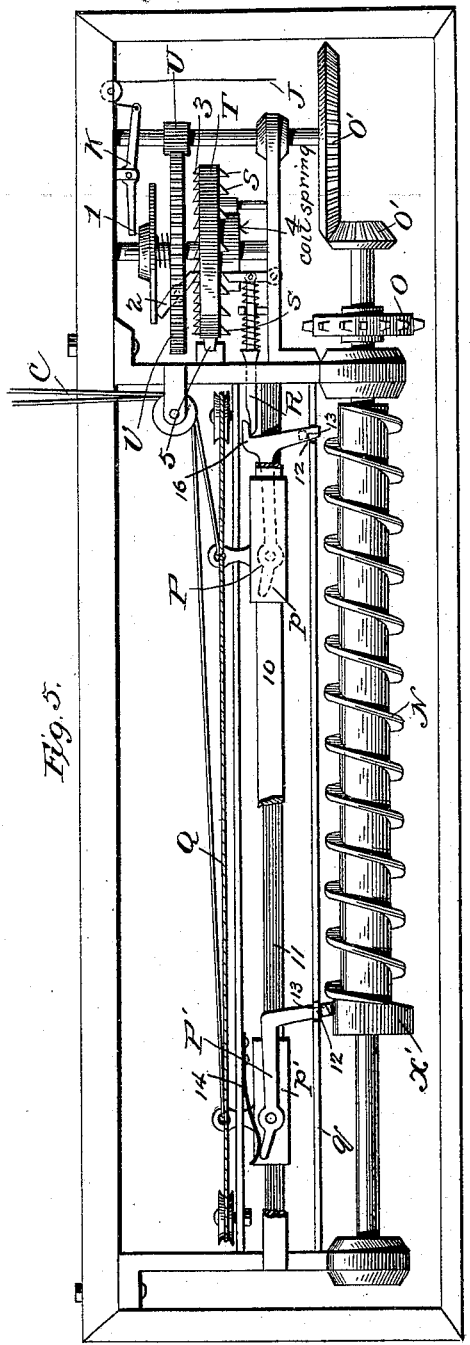
Attest  
Walter Donaldson  
F. L. Middleton
Inventor  
Wm A. Turner  
by Spear & Liehy  
Attys (No Model.) 3 Sheets—Sheet 3.

W. A. TURNER.
STATION INDICATOR.

No. 604,483. Patented May 24, 1898.

Attest:
Walter Donaldson
F. L. Middleton

Inventor
Wm. A. Turner
by Speer & Leely
Attys.

UNITED STATES PATENT OFFICE.

WILLIAM A. TURNER, OF SAN FRANCISCO, CALIFORNIA, ASSIGNOR TO THE AMERICAN INDICATOR COMPANY, OF SAME PLACE.

STATION-INDICATOR.

SPECIFICATION forming part of Letters Patent No. 604,483, dated May 24, 1898.

Application filed May 16, 1889. Serial No. 311,087. (No model.)

*To all whom it may concern:*

Be it known that I, WILLIAM A. TURNER, of the city and county of San Francisco, in the State of California, have invented certain new and useful Improvements in the Art of Actuating Street or Station Indicators; and I do hereby declare that the following is a full, clear, and exact description of the same.

Street and station indicators may be broadly divided into two classes—intermittently-operating and continuously-operating. The first class includes those in which mechanism is operated at certain intervals either by hand or by some external means, such as a series of tripping-blocks placed near the railway-track at the points where indications are to be made, which blocks come into contact with a lever or arm connected to the indicating mechanism. Indicators of this class are of course perfectly accurate when all the conditions necessary to their successful operation are complied with, and these conditions are, on the one hand, the infallibility of the conductor, and, on the other, the certainty that the connection from the indicator will make contact with the tripping-block. Without more than alluding to the impossibility of a constant compliance with the first condition it is sufficient to say with reference to the second that tracks are very often, and especially in winter, in such condition that the tripping-blocks are useless, not only because they are often completely covered with snow, but also because the indicator is liable to be operated at improper times by lumps of ice, loose stones, and other accidental obstructions with which the lever may come in contact. Tripping-blocks are also considered objectionable as tending to obstruct traffic, as well as on account of the expense of providing and placing in position the large number required on a long line of railway. These considerations have led to the invention and adoption of indicators of the "continuous" type, so called. The distinguishing feature of this class of indicators is that the operation of the indicator proper is caused by the motion of the car and requires no tripping-blocks or other external means to effect it. This class of indicators is called "continuous" because the primary operating mechanism is operated continuously so long as the car-wheels are revolving. The indicator proper, however—that is, the apparatus which directly operates the street or station displaying devices and their direct connections—is not necessarily continuous in operation. It may be intermittent and only operated at proper points by alternately connecting it with and disconnecting it from the primary mechanism, the indication being produced only when the parts are in connection and the indicator remaining stationary when they are disconnected. The primary mechanism may, however, be connected directly to the indicating-box, in which case a slow but continuous movement is given the indicator proper so long as the car-wheels are revolving. Under absolutely favorable conditions this type of indicator would operate correctly—that is to say, given a uniformly dry and level track with no use of brakes the ordinary continuous mechanism will operate with substantial accuracy. These conditions, however, are never met with in practical railroading, and hence all continuous indicators are certain to show an error, constantly accumulating and after repeated trips amounting to more than a city block. Each time the brakes are put on hard, so that the wheels slip on the track, the indicating mechanism ceases to operate, and repetitions of this cause alone are sufficient to accumulate loss enough to destroy the practical efficiency of the apparatus. This is particularly noticeable on cable-railways, where cars are often run down grades without the cable by gravity and are suddenly and frequently checked with the brakes.

The object of my invention is to insure the accurate operation of station-indicators of the continuous type. I have invented an improvement in the art of actuating such indicators, which improvement consists in mechanically correcting the continuously-moving mechanism at a certain time or times during a trip before the error has accumulated above a certain estimated maximum, and this may be done in various ways, according to the style of apparatus employed for indicating. First, when the primary mechanism is geared constantly to the indicating apparatus proper, so that there is a continuous movement of said indicating apparatus by positively or independently moving said indicating apparatus to its proper position at a proper time or times during the trip; second, when the indicator proper is alternately connected with and disconnected from the primary mechanism by moving positively or independently at a proper time or times the devices which control the connection, and, third, by resetting the indicator or the controlling device at the end of a trip in proper position to commence a new trip. It is not necessary that the actual amount of the error should be ascertained at or before the time of correcting, because since it is well known at what point the indicating mechanism ought to be at that time a positively-operating correcting device having a certain definite movement may be arranged to carry the mechanism to that point and no farther. The possible maximum of error is of course easily ascertained by experiments under different conditions, and this being known it is only necessary to provide a positively-operating correcting device which shall act upon the indicating mechanism at any point between absolute correctness and this maximum. The possible maximum of error would of course be estimated as greater than what could ever occur in practice.

The correcting devices or apparatus may be applied to any form of continuously-operating indicating mechanism and may be either automatic or non-automatic. If automatic, they may be operated externally, as by a tripping-block, or directly, as by some special movement of the car itself. I have not in the present application claimed any special form of corrector nor any special means for operating it; but I have shown in the accompanying drawings several different ways of embodying my invention, so as to fully illustrate it, and shall hereinafter describe them in detail.

Figure 9:
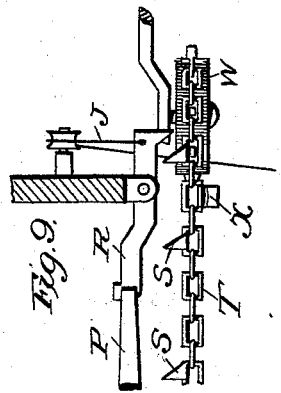
Figure 10:
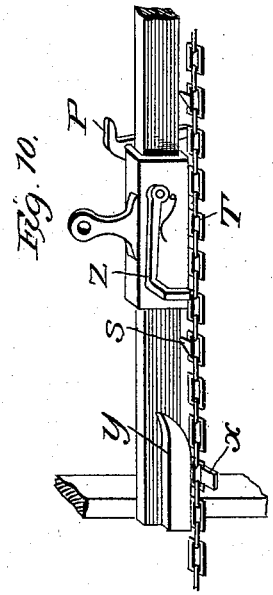

Figure 1 is a perspective showing one of the simplest forms of continuous indicator and an external means for operating the corrector. Fig. 2 is a longitudinal vertical section of a car, to which a simple form of rotary indicator is attached. Fig. 3 is a front elevation of the indicator shown in Fig. 2, the forward portion being removed to show the working parts. Fig. 4 is a side elevation of the correcting mechanism of Fig. 3. Fig. 5 shows another form of indicator with a continuously-moving operating mechanism constructed to operate the indicator intermittently. This figure also shows a resetting-corrector used in connection with said mechanism. Figs. 6 and 7 represent details of Fig. 5. Fig. 8 is a front elevation of another form of operating mechanism. Fig. 9 is an enlarged plan view of a portion of the chain and right-hand sprocket-wheel of Fig. 8. Fig. 10 is an enlarged front elevation of the left-hand portion of the sprocket-wheel chain and correcting appliance of Fig. 8.

Before describing the various devices illustrated in the drawings and to avoid confusion of terms I desire to state that in this specification when referring to an "indicator" or "station-indicator" I mean the box or other apparatus in the car for displaying the names of streets or stations; by "primary mechanism" I mean a mechanism connected to the car-axle, so as to derive motion therefrom, and which may or may not be connected directly to the indicator, as before explained; by "controlling device" I mean a separate mechanism intermediate between the primary mechanism and the indicator for controlling their connection in order to operate the indicator intermittently at proper times, and by "indicating mechanism," used broadly, I refer either to the indicator itself when geared to the primary mechanism or to the controlling device for governing an intermittently-operating indicator, according to which form of device I may be describing. The controlling device may properly be termed the "indicating mechanism," because it absolutely governs the motion of the indicator proper and is necessary to its successful operation at the points where indications are to be made.

Referring to Figs. 1, 2, 3, and 4, which show an indicator connected directly to the primary mechanism, so as to be operated continuously thereby, A represents a station-indicator within a car B. This indicator is of a well-known form and consists of a series of cards hinged upon an endless traveling belt or a pair of chains within a box and carried around so as to be permitted to fall successively across an opening in the box and display the name of street or station and such other matter as may be placed upon them. The indicator is driven continuously by a sprocket-chain, here for simplicity shown as passing directly from the car-axle to the vertical shaft C, Fig. 2, the shaft having near its upper end a worm which engages with a pinion loose on a shaft within the indicator-box, but causing said shaft to revolve by means of a fixed ratchet-wheel 3 and pawl 2. The proportions between the car-wheel, worm, and pinion are of course such as to retard or "gear down" the indicator to the slow movement required to produce an indication at each street. This proportion may, as already stated, be ascertained with sufficient accuracy to insure nearly correct indications under favorable conditions; but there remains the error occasioned by the various causes above alluded to. This error is corrected by the mechanism shown in Figs. 3 and 4. A slotted spring-latch K, having a spring $m$ and a projection M, slides on a guide-pin mounted on a projecting point of the indicator-box and is connected by a cord J with a lever I, pivoted on the car. The ratchet-wheel 3 has a pin L, shown as lying in the path of the projection M. An obstruction H near the track operates the lever I and pulls the cord and sliding latch against the pressure of the spring. The obstruction H is in this case supposed to be located near the end of the line of track, and the operation of the corrector in removing the accumulated error for the trip will now be explained.

As the ratchet-wheel 3 is fixed on the indicator-shaft, it is evident that the position in which the pin L ought to be at any point on or at the end of a trip can be exactly ascertained. This being the case the movement of the lever I is so regulated by the height or length of the obstruction as to cause the throw of the hook M to terminate when it has brought pin L to that point. Now if the indications have been made at precisely the right points throughout the trip then the pin L will be in its proper position when the lever I reaches the obstruction and the movement of the latch will not affect it; but if the indicator has been losing the pin will be behind the position where it ought to have been, and when the latch is pulled forward the pin is struck, the ratchet-wheel and shaft rotated ahead, and the indicating mechanism moved forward to its proper position. The normal position of the hook M is behind any observed or estimated loss of position by the pin L. Consequently the correction will be made when the pin is at any point between the previously-known correct position and the greatest estimated variation from it. Of course an indicator that could lose more than the estimate provides for would be practically worthless. If desired, this corrector may be non-automatic in its action, in which case the obstruction H and lever I would be dispensed with and the cord J carried to a point within reach of the conductor, who by pulling it at the proper place on the road will cause the slotted latch to move to the limit of its throw, and thus accomplish the correction in the manner before described.

In the devices illustrated in Figs. 5, 6, and 7 I have shown a form of mechanism in which the indicator is intermittently moved and in which the correction is accomplished by resetting the controlling device to its correct starting-point at the end of a trip. This indicator is intended to operate approximately in the middle of a block, so as to give a margin for either loss or gain to accumulate until the end of the trip. At the end of the trip, instead of starting on a new trip with the indicator in incorrect position, the controlling mechanism is reset. Thus the error in all the several trips of a car during its working hours never exceeds the possible maximum error of a single trip.

It is necessary to explain the allusion to the term "gain" as used in the preceding paragraph. If we assume that on a certain line of road under the most favorable conditions—that is, with a dry track and no use of the brakes—the car-wheels will theoretically make one thousand revolutions, then experiment will show what is the greatest number of revolutions in practical operation, what is the least number, and what is the average number. We will assume that the maximum number is one thousand and that the minimum and average numbers are respectively nine hundred and fifty and nine hundred and seventy-five. In the correcting devices first described any error will be estimated in terms of loss from the maximum one thousand, and any error between nine hundred and fifty and one thousand will be corrected by carrying forward the indicating mechanism to the position which it would have occupied had the car-wheels made one thousand revolutions. The indicator now being described, however, is so geared to the car-wheels as to operate on a basis afforded by the average number of revolutions, which in this case is supposed to be nine hundred and seventy-five. Now the wheels may make nine hundred and sixty revolutions, which would produce lost motion in the indicator. On another trip they may make nine hundred and ninety revolutions, which, while it represents a loss from the maximum of one thousand, represents also a gain over the average of nine hundred and seventy-five. When, therefore, in the preceding paragraph I speak of "gain," I mean not gain over the maximum, which is the basis of construction when the indicating mechanism is corrected by pulling forward, but gain over the average, which is the best basis of construction when the indicating mechanism is corrected by resetting.

The actuating mechanism shown in these figures is substantially that described in my Patent No. 394,799, granted December 18, 1888; but the screw, instead of being carried directly by the axle, is mounted upon a supplementary shaft geared to the latter, and the spring shown in the patent for returning the traveling latch after each indication is replaced by a second latch, which engages with the screw after each indication and carries the first latch back to its original position ready for a new indication. In this form the primary mechanism in immediate connection with the car-axle moves continuously, but said motion is transmitted to the indicator intermittently.

N represents a worm or screw on a shaft geared to the axle by a sprocket-wheel O and chain. The indicator (not shown) is operated intermittently through a cord C and a latch P, to which the cord is attached. The latch is pivoted to a block $p$, fitted to slide on a guide 10, and is arranged to be released from the retaining-bolt R and engaged with the worm when the indicating-station is reached. Its travel along the screw will pull upon the cord and operate the indicator, the screw being long enough to secure one complete operation of the indicator, and when the latch reaches the end of the screw it is automatically disengaged by a cam X' on the screw, which raises it, so that its projection 13 will be above the guide $q$ and be held up thereby. It is automatically returned to its normal position on the right, as shown, by a second latch P', pivoted to a sliding block p' on a guide 11. These sliding blocks are connected by a cord Q, so that while one block with its latch is moving in one direction the other block and latch are moving in the opposite direction. The position of the latches in relation to the screw is controlled during their travel by the guide q, having notches 12 on opposite edges at or near the screw ends. Both the latches have lateral projections 13, adapted to pass through the notches, and when either latch is raised by the cam X' its projection 13 passes through the notch in the guide q and is thus held up out of engagement during its travel to the right by its projection bearing on the edge of the guide. In a similar manner the latch having dropped through the notch on the right to engage with the screw is retained in this position during its travel by its projection bearing against the under edge of the guide. A spring 14, fixed to the frame, acts to retain the latches elevated after being lifted by the cam X'. The latch P has a lip 16, which is engaged by the sliding bolt R and is thus held normally up out of engagement with the screw during the interval between the indications. When a station is reached, the bolt is withdrawn, the latch falls, engages with the screw, and travels to the left, being retained by the guide q. Meanwhile the latch P', having been raised by the cam X', travels to the right out of engagement with the screw, and as it has no lip to engage with the bolt R it falls into engagement with the screw when the notch is reached, and thus returns the latch P to normal position again by traveling to the left and drawing upon the cords Q.

The retaining-bolt is displaced at proper times and the latch P released by a controlling device consisting of a series of teeth on a continuously-rotating loose wheel T, such teeth being properly spaced according to the points where indications are to be made. The wheel T is geared down to the requisite slow motion by pinions O', O', U, and V and is caused to rotate by a pawl 2, pivoted in the pinion V and engaging with a ratchet 3 on the wheel. The resetting device is a coil-spring 4, which winds up as the wheel T rotates against its pressure. At the regulating-point a cord J is pulled by a tripping block and lever or in any other way, and this, through a lever K and presser-disk l, releases the pawl, and the spring 4 throws the wheel T backward until it is stopped by the projection 5 on the wheel T striking the lug on the frame. This projection is of course so located as to stop the wheel when in primary position—that is, with the first tooth ahead of the lever which draws the retaining-bolt.

Figs. 8, 9, and 10 show another intermittently-operating indicator having a modified form of controlling device and corrector. A sprocket-chain T, having spaced teeth S, is substituted for the wheel T and is operated by a worm U, a loose pinion W, having a pawl 2, and a fixed ratchet-wheel 3 on the shaft of the sprocket-wheel V. The retaining-bolt R, in this case pivoted to the frame, is displaced by the teeth S in succession and releases the latch P, so that it may engage with the screw N in the manner before described. The correction is accomplished in this case by a pivoted latch Z on the main latch P in connection with a lug X on the chain and a stationary cam Y on the latch-guide. When the car reaches the regulating-point, the cord J is pulled. The movements have been so timed and the maximum loss so estimated that at this point the lug X will be at some point below the cam Y. Its proper position is, as before explained, accurately known, and that position is at the extreme limit of movement which the screw N can give to the pivoted latch Z. Consequently when the latch Z is depressed by the cam Y it will strike the lug X, if the latter has fallen short of its proper position, and will push the chain forward until the main latch P commences to return, leaving the lug X, and therefore the chain, in correct position.

It is evident that the required amount or frequency of correction will vary, but will ordinarily be in proportion to the length of the line. On very long routes it may be necessary to take up the loss at two or even more points on the round trip. These points can of course be accurately located by observations of the average and maximum loss in any distance, and it is only a matter of detail to place the lugs so as to cause the corrector to act at those points. It should also be stated that however the corrector may vary in form and even in mode of working it gives to the indicator-shaft or to the controlling device what I have herein called a "positive" or "independent" motion—that is, a movement to a fixed point and independent of its ordinary motion or actuation by the car-wheels. It remains to state that for operating the corrector various means may be used instead of the tripping-blocks or the hand-pull described. Thus on lines using cars with bogie-trucks advantage may be taken of the independent swing of one of the trucks on curves to pull or push a cord or rod connected to the corrector, and, in a similar way, of the vertical independent swing of the car-body in passing over the summit of a grade.

I have now described my invention, but in order to show its scope I desire to present briefly and in contrast with it the present state of the art. Hitherto correction of continuous indicators cannot be said to have been practiced at all. The universal and only effort has been to make the indicator run accurately and therefore to need no correction. If corrections have been made, they have been made desultorily and not until false indications have occurred, and then always by intelligent interference with the unintelligent mechanism. Thus the present process of operating continuous indicators consists in running them on the supposition that they will indicate correctly. When they do indicate falsely, their machinery must be moved by hand until it is in proper position. My process reverses all this. I begin with the assumption that the indicator will not run uniformly and will therefore err. I correct before a false indication has been made, and I make the correction by mechanical means, which brings the indicating mechanism, at least once on each trip, to an exact predetermined position.

The contrast in results is equally great. Hitherto the continuous indicator has never been successfully operated. Its false indications and the constant watchfulness and trouble required to correct them have always driven it from use. On the other hand, actual practice under the mose unfavorable conditions has shown that by my process the continuous indicator will operate constantly and unerringly. No detailed recital of advantages can add to the force of this statement.

It is evident not only that many different forms of machinery may be employed for the carrying out of the method herein described, but, moreover, that in the details of the process itself some variation may be made without substantially changing the nature of the process.

Having thus fully described my invention, what I claim as new, and desire to secure by Letters Patent, is—

1. The combination with a station-indicating mechanism of the continuous type, of a positively-operated and independent correcting device, for positively moving the indicating mechanism at a certain time independently of its normal motion, whereby the errors accumulated up to that time are corrected, substantially as set forth.

2. In combination, a station-indicator, a continuously-operating driving mechanism therefor, a detachable connection between said indicator and the continuously-operating driving mechanism, and a corrector for moving the indicating mechanism to a predetermined position, substantially as described.

3. In a station-indicating apparatus, the combination of a continuously-operating driving mechanism, an intermittently-operating indicating mechanism, a continuously-operated device for controlling the connection of said driving and indicating mechanisms, and a positively-operated corrector for moving said controlling device independently of its normal motion, to correct errors in its position, substantially as set forth.

4. The combination with mechanism for controlling the operation of a station-indicator, said mechanism being driven continuously by driving mechanism by means of a ratchet and pawl, of a corrector set in operation independently of the driving mechanism, for positively moving said controlling mechanism, to correct errors in its position, substantially as described and shown.

5. The combination of an intermittently-operated station-indicating mechanism adapted to be connected to a continuously-operated driving mechanism, a retaining-bolt for preventing such connection, a traveling chain having spaced teeth for successively displacing said bolt and thus permitting such connection, and a corrector set in operation independently of the driving mechanism for moving said chain to correct errors in its position, substantially as set forth.

6. In a station-indicating apparatus having a continuous driving mechanism, and an intermittently-operated indicating device, a corrector for correcting errors in the position of the indicating device, in combination with a ratchet-wheel intermediate between the driving mechanism and the indicator adapted to transmit the motion of the driving mechanism but to be moved independently of its normal motion by said corrector to a definite point at a definite locality, substantially as set forth.

7. In a station-indicator of the continuous type, the combination of a primary operating mechanism driven by the motion of the wheels, an indicating mechanism, and a detachable connection between said primary operating mechanism and indicating mechanism whereby the indicating mechanism is permitted to be moved independently of the primary operating mechanism, substantially as described.

WILLIAM A. TURNER.

Witnesses:
LEE D. CRAIG,
B. B. DUNCAN.